United States Patent
Wood et al.

(10) Patent No.: US 10,025,692 B2
(45) Date of Patent: Jul. 17, 2018

(54) SCALABLE CONTINUOUS INTEGRATION AND DELIVERY SYSTEMS AND METHODS

(71) Applicant: PAYPAL, INC., San Jose, CA (US)

(72) Inventors: Zachary Paul Wood, San Jose, CA (US); Justin Vincent Montoya, Sunnyvale, CA (US)

(73) Assignee: PAYPAL, INC., San Jose, CA (US)

( * ) Notice: Subject to any disclaimer, the term of this patent is extended or adjusted under 35 U.S.C. 154(b) by 142 days.

(21) Appl. No.: 15/199,837

(22) Filed: Jun. 30, 2016

(65) Prior Publication Data

US 2017/0039062 A1   Feb. 9, 2017

Related U.S. Application Data

(60) Provisional application No. 62/202,132, filed on Aug. 6, 2015.

(51) Int. Cl.
| | |
|---|---|
| G06F 9/44 | (2018.01) |
| G06F 11/36 | (2006.01) |
| G06F 8/71 | (2018.01) |
| G06F 8/30 | (2018.01) |
| G06F 8/70 | (2018.01) |
| G06F 11/07 | (2006.01) |
| G06F 8/65 | (2018.01) |

(52) U.S. Cl.
CPC ............ G06F 11/3628 (2013.01); G06F 8/30 (2013.01); G06F 8/65 (2013.01); G06F 8/70 (2013.01); G06F 8/71 (2013.01); G06F 11/0706 (2013.01); G06F 11/079 (2013.01)

(58) Field of Classification Search
CPC ..... G06F 8/30; G06F 8/65; G06F 8/68; G06F 8/70; G06F 8/71; G06F 11/0706; G06F 11/079; G06F 11/3628
USPC .................................. 717/120–123, 168–173
See application file for complete search history.

(56) References Cited

U.S. PATENT DOCUMENTS

| | | | | |
|---|---|---|---|---|
| 8,677,315 | B1 * | 3/2014 | Anderson | ................. G06F 8/60 |
| | | | | 717/101 |
| 2013/0152047 | A1 | 6/2013 | Moorthi et al. | |
| 2013/0340076 | A1 | 12/2013 | Cecchetti et al. | |
| 2014/0053135 | A1 | 2/2014 | Bird et al. | |

(Continued)

OTHER PUBLICATIONS

Kevic et al., "Collaborative Bug Triaging using textual Similarities and Change Set Analysis," 2013.

(Continued)

*Primary Examiner* — Qing Chen
(74) *Attorney, Agent, or Firm* — Haynes & Boone, LLP (57) ABSTRACT

A scalable continuous integration (CI) system and/or method may be provided to manage and implement a plurality of code changes submitted in a code base. In particular, the scalable CI system may use a divide-and-conquer approach in which a set or a queue of code changes may be divided into smaller sets/queues of code changes. The division may continue recursively until the rate of defect introduction per change set, the rate of change set delivery per time, and the pipeline latency in the divided sets/queues satisfy a particular threshold. Change sets in the divided sets/queues that fail particular quality constraints may be removed from the divided sets/queues. After the failed change sets have been removed, the divided sets/queues may be recombined back into one set/queue.

20 Claims, 8 Drawing Sheets

(56) References Cited

U.S. PATENT DOCUMENTS

| | | |
|---|---|---|
| 2014/0053138 A1 | 2/2014 | Yassin et al. |
| 2015/0033210 A1 | 1/2015 | Decked et al. |
| 2015/0052501 A1* | 2/2015 | Shani .................. G06F 11/3688 717/124 |
| 2015/0220426 A1* | 8/2015 | Spektor .................. G06F 11/36 717/131 |
| 2016/0034270 A1 | 2/2016 | Swierc et al. |
| 2016/0034380 A1* | 2/2016 | Shani .................. G06F 11/3636 717/172 |
| 2016/0063282 A1* | 3/2016 | Shani ....................... G06F 8/60 717/121 |
| 2016/0357519 A1 | 12/2016 | Vargas |

OTHER PUBLICATIONS

Cook et al., "Finding Bugs in Source Code Using Commonly Available Development Metadata," 2015.

\* cited by examiner

SCALABLE CONTINUOUS INTEGRATION AND DELIVERY SYSTEMS AND METHODS

CROSS REFERENCE TO RELATED APPLICATIONS

Pursuant to 35 U.S.C. § 119(e), this application claims priority and the benefit of U.S. Provisional Patent Application Ser. No. 62/202,132, filed Aug. 6, 2015, which is incorporated by reference in its entirety.

BACKGROUND

The present invention generally relates to a scalable continuous integration and delivery system.

Continuous Integration (CI) systems, such as JENKINS, BAMBOO, and other open source or off-the-shelf CI systems are provided to manage the process of making changes to software code bases. Typically, CI systems apply a single release pipeline that builds, deploys, tests, and releases software products. However, for ultra-large code bases (with millions/billions of lines of code), this single pipeline model may break down due to factors such as a large volume of code changes introduced, a long latency in the pipeline, or a high rate of defects in the code changes. Thus, there is a need for a system and/or a method for efficiently managing code changes in large code bases.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a scalable CI system and/or method may be provided to manage and implement a plurality of code changes submitted in a code base. In particular, the scalable CI system may use a divide-and-conquer approach in which a set or a queue of code changes may be divided into smaller sets/queues of code changes. The division may continue recursively until the rate of defect introduction per change set, the rate of change set delivery per time, and the pipeline latency in the divided sets/queues satisfy a particular threshold. Change sets in the divided sets/queues that fail particular quality constraints may be removed from the divided sets/queues. After the failed change sets have been removed, the divided sets/queues may be recombined back into one set/queue. Thus, the failed change sets may be efficiently removed from the change set/queue. This approach may conserve computing resources and may achieve cost saving, especially in ultra-large code bases where millions/billions of lines of code may be implemented.

According to an embodiment, a scalable CI system and/or method may implement an automated failure analysis. In particular, a defect search technique/algorithm, a machine learning technique/algorithm, or both, may be implemented to identify failing change sets in a queue of change sets. The machine learning algorithm may first be applied to see if failing change sets may be identified, then the system may fall back to the defect search algorithm when the machine learning technique is not adequate. In the machine learning technique, the system may use an artificial neural network (ANN) to determine failure risks of change sets. The identified failing change sets may be removed from the queue.

Figure 1:
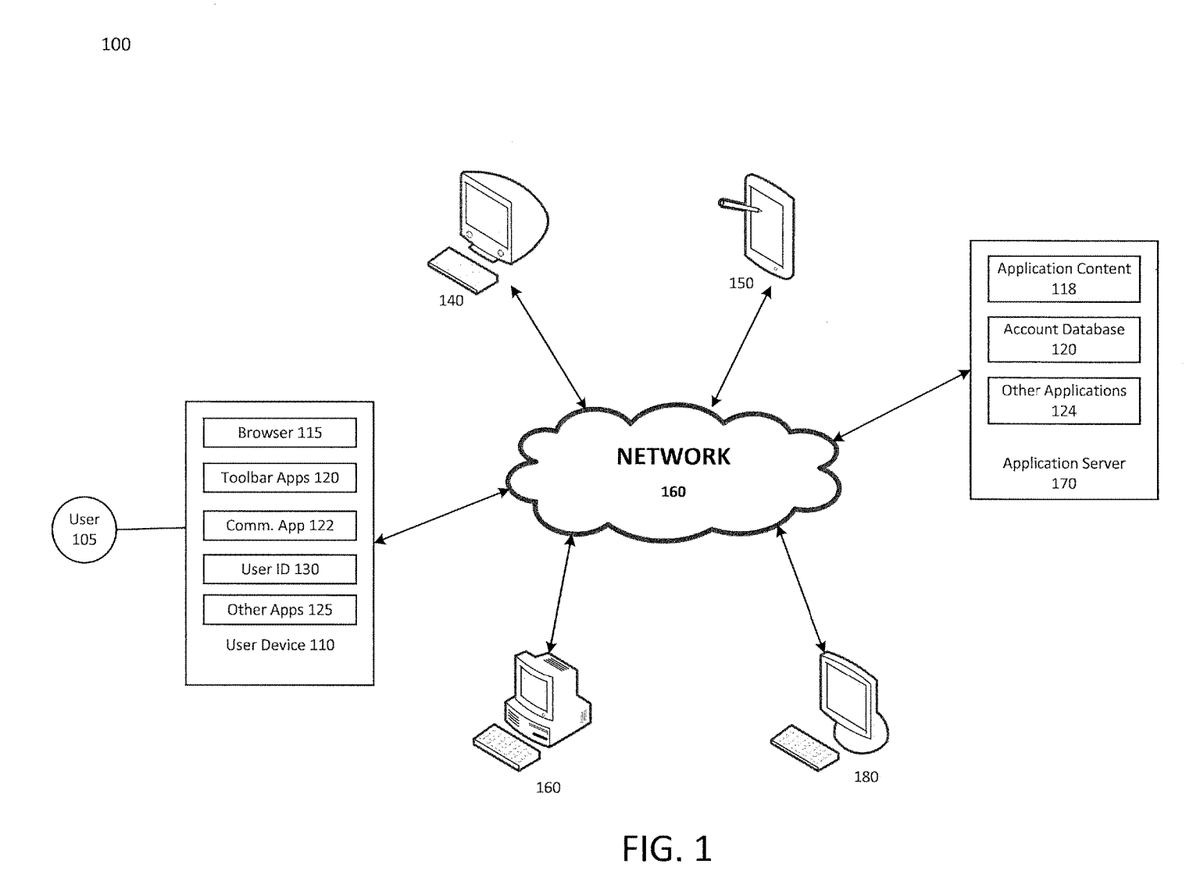
FIG. 1 is a block diagram of a networked system suitable for implementing a scalable continuous integration and delivery system according to an embodiment.

FIG. 1 is a block diagram of a networked system 100 configured to implement a scalable continuous integration and delivery system in accordance with an embodiment of the invention. Networked system 100 may comprise or implement a plurality of servers and/or software components that operate to perform various processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, user devices 140, 150, 160, and 180, and an application server 170 in communication over a network 160. Application server 170 may be maintained by a software company that maintains and develops code bases that offer various online services or applications. A user 105, such as a software developer, may utilize user device 110 to develop and submit code changes/modifications to the code bases maintained at the application server 170. For example, download and install applications offered at the application server 170. For example, user 105 may utilize user device 110 to compose software codes for making modifications/changes to the code bases maintained at the application server 170. The user 105 may submit the code changes to the application server via the network 160. Although only one application server is shown, a plurality of application servers may be utilized.

User devices 110, 140, 150, 160, and 180, and application server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, wearable device, laptop computer, and/or other types of computing devices capable of transmitting and/or receiving data, such as an iPad™ or an iPhone™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, or make transactions.

User device 110 may include one or more user identifiers 130 which may be implemented, for example, as operating system registry entries, cookies associated with browser application 115, identifiers associated with hardware of user device 110, or other appropriate identifiers, such as used for account registration and/or user/device authentication. In one embodiment, user identifier 130 may be used to associate user 105 with a particular application account at the application server 170. A communications application 122, with associated interfaces, enables user device 110 to communicate within system 100.

User device 110 may include applications for collecting location data, such as geo-location data via Global Positioning System (GPS), temperature data, altitude data, humidity data, data regarding device movement, ambient sound data, imaging data via a camera, and etc. Further, geo-fencing or wireless beacon technology may be used to define a location. User device 110 may detect signals from devices that implement geo-fencing or wireless beacon technology. These environmental data may be utilized to determine a location or environment in which user device 110 is located.

Application server 170 may be maintained, for example, by a software company or an organization, such as a company or an enterprise. In some embodiments, the application server 170 may include a network of servers. The application server 170 may store a code base that contains a relatively large set of machine-readable instructions (e.g., millions of lines of codes). The code base may perform various functions when executed by computers/servers of the company/organization or by other client devices, such as user devices 110, 140, 150, 160, or 180 when connected to the application server 170.

Application server 170 may application content 118 may include the code base, such as various data files or various application files. The code base may include files and/or directories of files that include machine executable instructions. In an embodiment, application content 118 may also be time-specific content, such that the content may change based on the time of day, day of the week, month, season, and the like. Application server 170 may also include an account database 120 that includes account information for users having an account on application server 170, such as user 105. Account information in account database 120 may also include account information of users who develop and contribute to the code base. Application server 170 may include other applications 124 providing other functionalities.

Application server 170 may maintain and manage the code base including receiving updates and/or modifications from various users. Due to the large scale of the code base, the application server 170 may frequently receive updates/modifications from numerous users simultaneously. As such, the application server 170 may process a large number of updates/modifications to the code base simultaneously. For example, users of user devices 110, 140, 150, 160, and 180 may compose/formulate code changes at their respective device and submit the code changes to the application server 170 concurrently. The application server 170 may process the code changes from these users to make various changes/updates to the code base. For example, the application server 170 may test and validate the code changes before incorporating the code changes into the code base. The application server 170 may then build, deploy, test, and release the code base (not necessarily in that order) using the code changes received.

Figure 5:
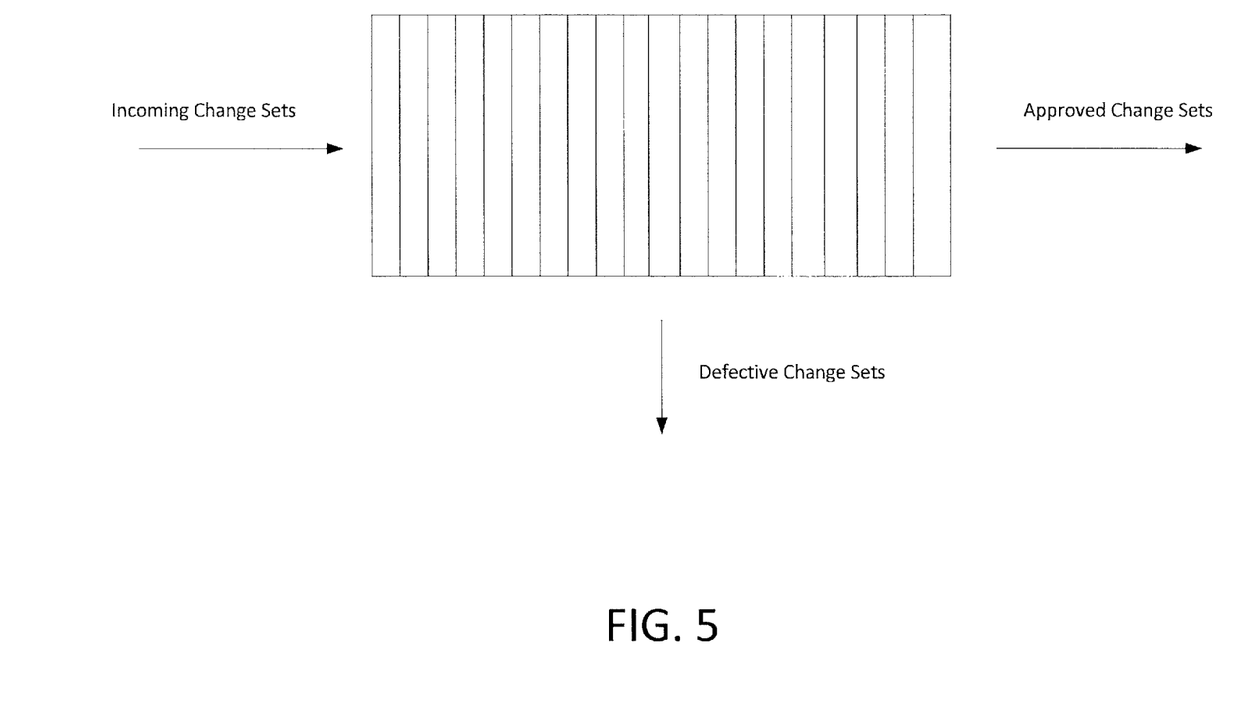
FIG. 5 is a diagram illustrating a CI pipeline according to an embodiment.

As shown in FIG. 5, the incoming code changes may be received as incoming change sets. The incoming changes sets may be entered into a queue (e.g., in the order of when they are received). The application server 170 may test and validate the code changes. Defective change sets may be rejected while approved change sets may be accepted and integrated into the code base. For ultra-large code bases (e.g., millions/billions of lines of codes) maintained in an application server with a single depository or in a large distributed systems with multiple depositories, the code changes may be submitted to the application server 170 at a relatively high rate, which may cause the pipeline model to breakdown when the volume of change sets received overwhelms the processing ability of the application server 170. Thus, an improved model as described herein is beneficial to improve the processing efficiency of the application server 170.

In embodiment, a divide-and-conquer approach may be taken to solve the scaling problem of applying continuous integration to ultra-large code bases. The divide-and-conquer approach may be utilized for an ultra-large code base hosted in a single repository or a distributed repository model. When the application server 170 receives change sets from users, the application server 170 may place the change sets into a queue, such as a first-in-first-out (FIFO) queue. The application server 170 processes the change sets to find and remove change sets that fail on one or more quality constraints. Removal of changes sets that fail quality constraints may allow a final integrated set of changes sets to exit the queue that have satisfied all quality constraints and are considered certified for public release.

As time progresses, the queue may fill with incoming change sets while change sets already in queue are in progress for quality certification. In a conventional approach, the application server 170 may take all change sets currently in queue and test them against the quality constraints. However, a continuous integration implementation for an ultra large code bases may start to experience issues due to a number of factors, such as an increase in the rate of change sets received by the application server 170, an increase in a latency of the pipeline, or an increase in a defect rate in the queue increases. The reason these issues arise is that for each queue accepted into the continuous integration for testing may have on average one change set that does not pass quality constraints. The further this threshold is exceeded, the higher the average number of failing change sets per queue, which leads to the situation where most to all executions of the continuous integration system may fail due to one or more change sets that fail quality constraints.

In the conventional approach, an attempt to execute the continuous integration one change set at a time may lead to a situation in which the queue fills at a faster rate than it is emptied. This problem may arise when the number of changes sets delivered to the queue during a continuous integration execution is greater than the single change set that is emptied from the queue. Conventional approach may provide more hardware to process the continuous integration certification of the individual changes in parallel, but for an ultra-large code base, the conventional approach may be costly because each execution of this certification process has a significant cost that may require multiple dedicated servers. Additionally, the conventional approach may not provide a means to certify all the integrated change sets to prevent public release of code containing integration defects.

Figure 2:
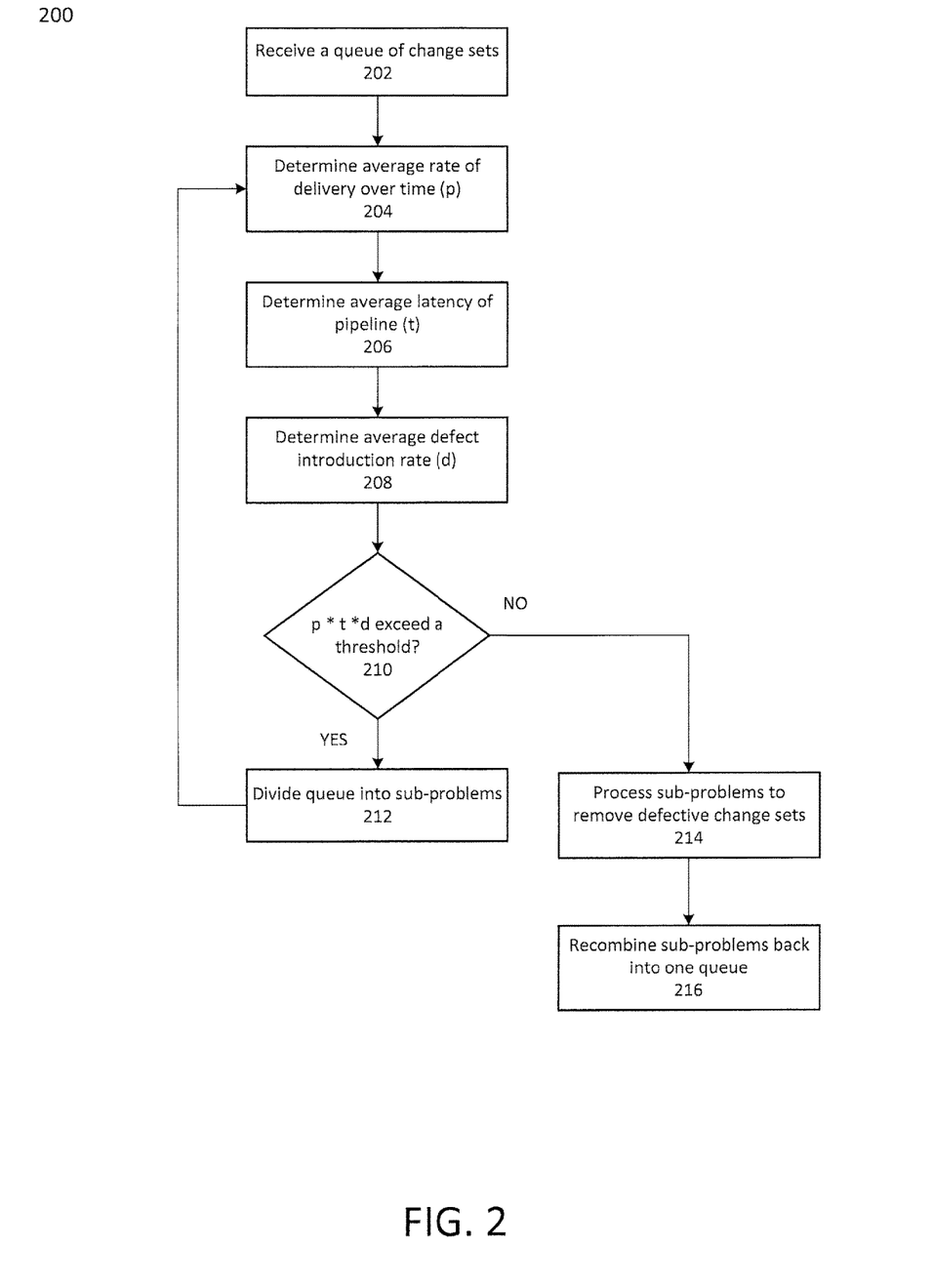
FIG. 2 is a flowchart showing a process implementing a divide-and-conquer approach to a continuous integration (CI) system) according to an embodiment.
Figure 6:
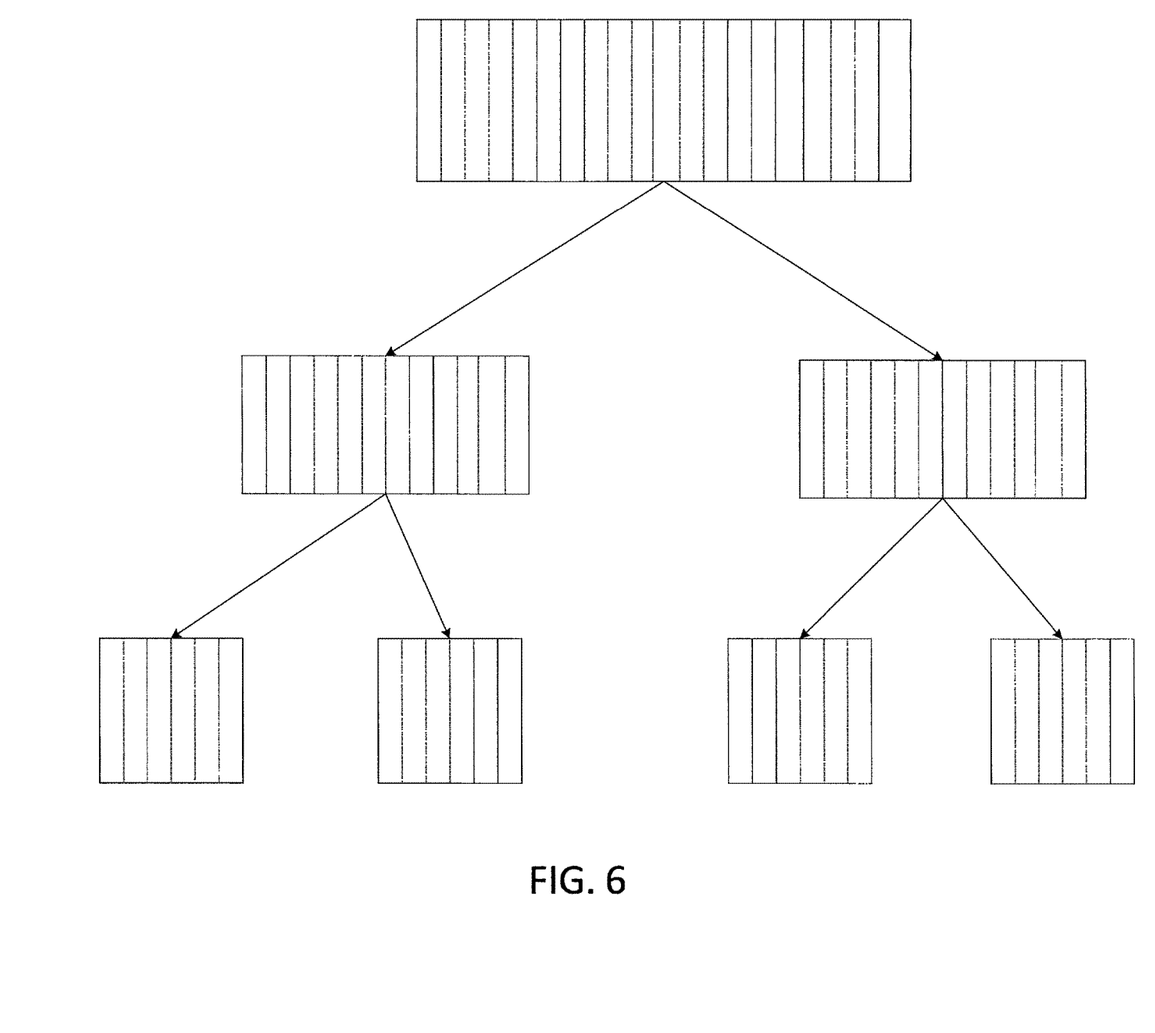
FIG. 6 is a diagram illustrating a divide-and-conquer approach for a CI system according to an embodiment.

In a divide-and-conquer approach, a queue of a continuous integration pipeline may be broken down into sub-problems by dividing the change sets within the queue into smaller queues. The division may continue recursively until each sub-problem satisfies a particular threshold with respect to a rate of change set delivery per time, a pipeline latency (queue execution latency), and a rate of defect introduction per change set. Referring to FIG. 6 which shows the recursive division of queues, the build tasks and evaluation of quality constraints of the continuous integration pipeline can be broken up or sharded into smaller jobs that then correspond to a level of recursion in the divided queues. The latency to complete the sharded tasks are desired to be at a minimum at the leaf nodes in the recursion and increasing monotonically as the queues are recombined. Referring to FIG. 2, which illustrates a flowchart showing a process implementing a divide-and-conquer approach to a continuous integration (CI) system according to one embodiment. The process 200 may be executed by the application server 170, or a combination of user devices and application server 170.

At step 202, the application server 170 may receive a queue of change sets for making updates/modifications to the code base stored at the application server 170. A change set may be defined as a discrete unit of change when applied to the source code that will transition the source code from one state to another. For example, users may operate user devices 110, 140, 150, 160, and/or 180 to compose or formulate code changes and may submit the code changes to the application server 170. In an example, the users may use user devices to log in at the application server 170. The application server 170 may provide a user interface (e.g., an online user interface) for the users to make changes to the code base. As such, the users may access a copy of the code base at the application server 170 to review and make changes to the code base. As such, the user devices need not download the entire copy of the code base. Multiple users/user devices may submit code changes to the application server 170 via network 160 simultaneously.

At step 204, the application server 170 may determine an average rate of delivery over time (p) for the queue. The average rate of delivery may indicate a volume of code changes received by the application server 170 in a period of time. The average rate of delivery may be determined by the number of incoming change sets divided by the period of time over which those change sets are added to a particular queue. For example, the application server 170 may receive 80 change sets in a minute. The application server 170 may deploy a counter configured to increment based on the number of code changes received. The volume of code changes received may fluctuate over time. Thus, the application server 170 may determine an average of the delivery rate. For example, the application server 170 may determine an average delivery rate for the last 20 minutes.

In an embodiment, when the rate of delivery fluctuates rapidly, the application server 170 may take the average over a longer period of time, in order to determine a more accurate average. In some embodiments, the application server 170 may monitor the delivery rate continuously and may record and store the delivery rates in a database of historical delivery rates. The application server 170 may analyze the database of historical delivery rates to determine trends at different time of the day, different day of the week or month, and/or different season of the year. For example, more change sets may be submitted to the application server 170 on a week day than on the weekend. In another example, more change sets may be submitted during a regular work day compared to a national holiday. The application server 170 may determine the average rate of delivery based on the historical data.

In some embodiments, the application server 170 may predict a future delivery rate to anticipate any large changes in the volume of change sets received. For example, the application server 170 may predict, based on the historical data, that a large volume of change sets will be received tomorrow on Monday after a long weekend. Thus, the application server 170 may anticipate and take appropriate actions to prepare for the large inflow of change sets. In an embodiment, the application server 170 may present or broadcast the average delivery rate in real time to the users. Thus, the users may see the average delivery rate and may choose to submit change sets when the application server 170 less busy and avoid submitting change sets when the application server 170 is overwhelmed. In another example, the application may be automatically scaled up (e.g., in a cloud environment) to prevent queue overflow, such as automatically adding new server nodes to the server pool for application server 170 based on an increase in average delivery rate.

At step 206, the application server 170 may determine the average latency (t) to perform evaluation of the quality constraints for the queue including performing build and publication of change sets. The total latency of evaluation of the quality constraints for the queue may be measured based on a time difference between when a change set is received and when the evaluation of the quality constraints for that queue is completed. The application server 170 may generate a time stamp for each change set received. The application server 170 also may generate a completion time stamp for each change set exiting the queue. The application server 170 may determine the latency of the evaluation of quality constraints based on how long it takes for a change set to exit the queue from the time of receipt. For example, if a change set enters a queue with a relatively low latency (e.g., a queue with a couple hundred unit tests to execute), it may take several seconds or less for the unit tests to complete and the application 170 to exit the change set from the queue. For a queue with a relatively large latency (e.g., a queue that deploys to a distributed environment and runs the entire set of integration test suites with tens of thousands of test cases or more), it may take hours or days to complete. The application server 170 may determine the average latency for a particular queue by taking an average of the time for multiple change sets to exit the queue.

At step 208, the application server 170 may determine the average defect introduction rate (d) per change set. As shown in FIG. 5, the application server 170 may test and validate the change sets received from users. If a change set is not validated or is defective, the application server 170 may reject the change set. The application server 170 may determine how many changes are defective within a change set. The application server 170 may determine an average defective rate of change sets in the queue. The average defect introduction rate for a queue may be determined by dividing the number of change sets entering a queue over a period of time that are determined to have one or more defects by the total number of change sets entering a queue over that same period of time. For example, if 100 change sets enter a queue in a 1 hour period, and of those 100 change sets 15 fail the quality constraint testing associated with that queue, then the average defect introduction rate would be 15 defects per 100 change sets per hour, or 0.15 defects/(change set×hour).

At step 210, the application server 170 may determine whether the product of the average rate of change set delivery per time, the average rate of defect introduction per change set, and the average pipeline latency in the queue exceeds a particular threshold. For example, the application server 170 may utilize the following inequality:

$$dpt \leq 1$$

where d is the average rate of defect introduction per change set, p is the average rate of change set delivery per time, and t is the average pipeline latency. This inequality may be implemented for uniform distributions. In other embodiments, other factors or parameters may be incorporated to provide for a statistical model for non-uniform distributions.

If the product of d p t exceeds the threshold in step 210, the application server 170 may divide the queue into sub-queues at step 212, and the process may return to steps 204-209 to determine d, p, and t for the sub-queues and determine whether the product of d, p, and t for the sub-queues exceed the threshold. The application server 170 may perform this process recursively until the queue is divided into a sub-queue that is small enough to satisfy the conditions of the threshold. For example, as shown in FIG. 6, the original queue may be divided into two sub-queues, and the two sub-queues may be further divided into four smaller sub-queues. The process may continue recursively until each of the sub-queues satisfies the conditions as noted above with respect to the product of the average rate of change set delivery per time, the average rate of defect introduction per change set, and the average pipeline latency in the queue.

In some embodiments, further tuning of the max sub-problem size may achieve a target worst-case success rate for each sub-problem. Each depth-level of the recursion may be tuned by using the equation:

$$1 \leq \text{SIZE}(P^l) = \frac{1 - s_{target}^l}{d^l}$$

where s is the success rate of the pipeline, $s_{target}^l$ is the target success rate for a recursion depth l, $P^l$ is a sub-problem (e.g. sub-queue) at recursion depth l, and SIZE ($P^l$) is the number of change sets in the given problem or sub-problem P (e.g., sub-queue P). For example, the equation may take the desired success rate of a queue at recursion depth l, then leverage the calculated defect rates $d^l$ determined in step 208 to calculate the size of the queues SIZE ($P^l$) where the size of a queue is the maximum number of change sets allowed in that queue before executing the evaluating of the quality constraints. This size is then used by the divide-and-conquer algorithm to set the sub-problem size of the queues at each depth level in the recursion. The sizes of queues may vary by depth in the recursion level and may depend on how the build tasks and quality constraints are sharded.

Accordingly, a target success rate for a queue can be selected in such a way that for a given defect rate for the number of change sets in a sub-problem, or SIZE ($P^l$), is less than 1 which may not be possible since the queue-size must be a positive integer. In these cases, a default minimum of 1 may be applied as shown in the above equation until the defect rate is reduced to achieve the target success rate. Similarly, if the defect rate d ever reaches 1, then all change sets are defective and SIZE ($P^l$) should remain at 1 until the defect rate is reduced through management processes. This is to capture the boundary case where every change set in defective in the queue. This rare scenario may indicate that all contributing developers produced low quality software.

If the product of d p t does not exceed the threshold in step 210, the application server 170 may process the sub-queues to determine whether there are any defective change sets in the sub-queues at step 214. After the sub-queues are processed, the sub-queues may be recombined into a larger queue recursively at step 216 to result in a final single queue with zero defective change sets.

With most divide and conquer algorithms, the same function to solve and recombine each sub-problem may be used. However, for defect detection of ultra-large code bases with the costly nature of building, unit testing, and integration testing of the code, the process of integration testing may take hours, days, or even weeks with significant hardware and personnel costs just for the certification of a single public release. As such, in some embodiments, subsets of the quality constraints are tested in the sub-problems where the resource cost of testing these subsets of quality constraints increases monotonically as the recursion depth decreases. As the depth level decreases, the subset of quality constraints tested may include the union of all quality constraints tested in the child nodes and the subset assigned to the current node, or only the current subset. Upon reaching the shallowest depth or root node, all quality constraints may be tested to ensure no new defects are introduced in the recombination, or integration, of the sub-problems. Accordingly, the quality constraints may vary based on the depth level in the recursion process. For example, at deeper levels, the time to perform tasks to evaluate quality constraints may be less. The time to evaluate quality constraints may increase as the recursion process traverse toward shallower levels. Quality constraints may include various validation checks occurring at a particular queue depth level, such as executing a build and determining the pass/fail result of a build, publishing a build, static analysis, unit tests, integration tests, or other validations/certifications that might be required before the new code changes are released.

The divide-and-conquer approach may be implemented to mitigate the need for hardware resources at each level. However, the development cycle may still face some churn due to failing change sets causing the other non-failing change sets in the queue to fail. Often times the process to find the failing change set(s) may require human intervention to complete the analysis and may cause delays in delivering new product features. Accordingly, an automated failure analysis may be implemented to detect failing change sets that can then be removed from the queue to allow the remaining non-failing change sets in the queue to move forward, thereby increasing the successful certification rate of change sets.

Figure 3:
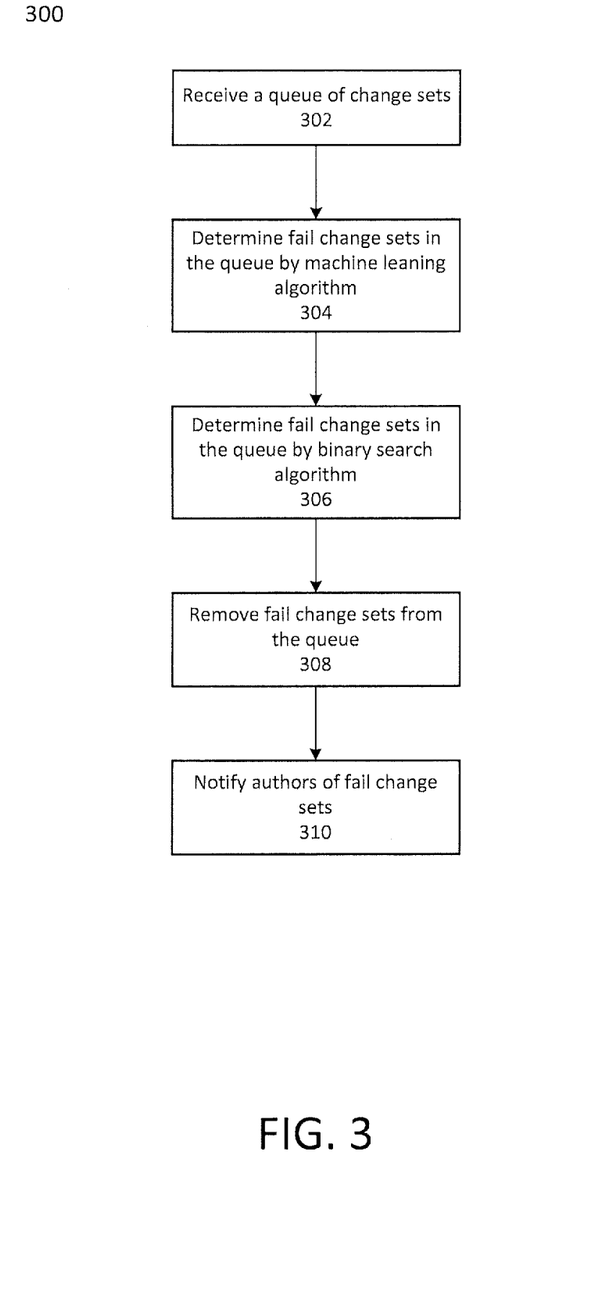
FIG. 3 is a flowchart showing a process implementing an automated failure analysis in a CI system according to an embodiment.

Referring now to FIG. 3, which illustrates a flowchart showing a process implementing an automated failure analysis in a CI system according to one embodiment. At step 302, the application server 170 may receive a queue of change sets. Step 302 may be similarly implemented as step 202. The automated failure analysis may use a defect search technique and/or machine learning technique to detect and remove failing change sets. In some embodiments, the defect search technique and the machine learning technique may be used in combination. At step 304, the application server 170 may detect defective commits in a queue that failed quality constraints with machine learning algorithms. The machine learning technique may have the potential to identify commits very quickly, linear in the number of defective change sets (m) and an amortized constant in the size of the queue(n=SIZE(P)):

$$O(m)$$

Although there is no guarantee that the machine learning technique will find the size of the queue which may hit a linear running time in n:

$$O(mn)$$

However, when combined with a modified defect search, the worst case time is still linear in the number of defective change sets and logarithmic in the size of the queue:

$$O(m \log n)$$

Although the worst case is linear in the number of defective change sets per queue m, m is expected to be a constant based upon the threshold settings, as described in step 210, which gives us an expected average case:

$$O(\log n)$$

The machine learning algorithm and defect search algorithm are used in combination by first applying the machine learning algorithm at step 304 to see if the failing change set(s) can be easily identified, then falls back to the defect search algorithm at step 306 when the machine learning algorithm does not provide satisfactory results. When using the defect search, if all change sets in the queue are defective, then the worst case running time is greater than linear; if situation occurs often, then a better option is to check each change set individually to keep the check linear and avoid the additional cost of the search. This may be dynamically adjusted based upon historical data.

The machine learning algorithm may detect which change sets are the most likely to have caused the failure by leveraging the change set elements or change set features (e.g. files, authors, methods, classes, etc.) to create weighted associations between the change sets element/feature and the quality constraints where a higher weight indicates that the presence of a change set element/feature could cause the associated quality constraint to fail. This may be accomplished using simple weighted associations or artificial neural networks to classify the change sets by the likelihood of causing a quality constraint violation. For example, weighted links between source control elements and quality constraints may be provided where the weight of a link is determined by the number of times the source control element has been present in a change set that caused a failure for the particular quality constraint. For an artificial neural network (ANN), inputs for the quality constraints and change set elements may be connected. This is connected to a hidden or functional layer that is then connected to the output nodes. The connections from the input layer to the hidden layer are arranged in such a way as to expedite the training process of the ANN. The hidden layer is then connected to the output layer to return the likelihood that the current change set may cause the quality constraint failures.

Figure 7:
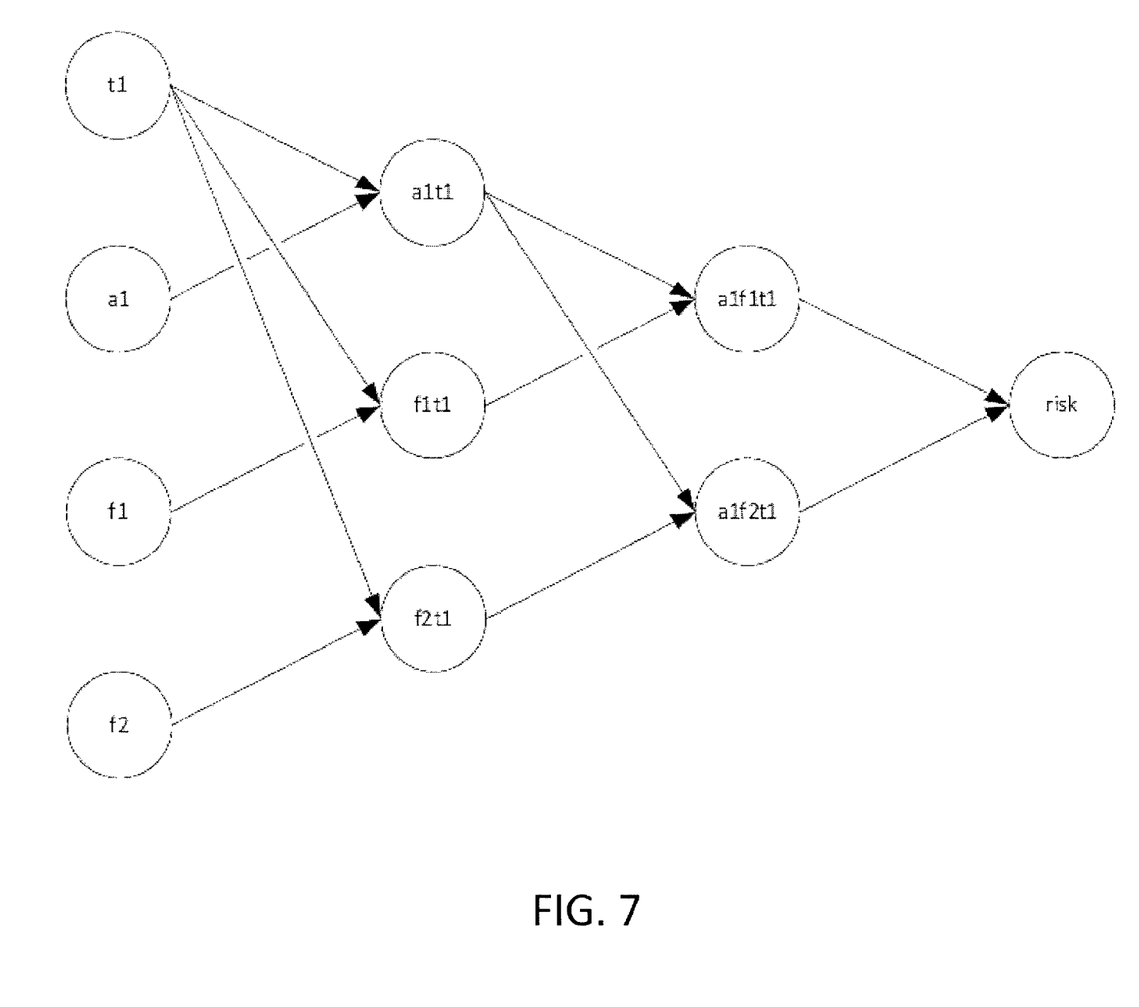
FIG. 7 is a diagram illustrating a machine-learning technique in an automated failure analysis according to an embodiment.

FIG. 7 illustrates an example of an artificial neural network. The inputs to the ANN may be the quality constraints or tests that are currently failing and a change set that is under evaluation. An input node may be created for each quality constraint such that a 1 indicates the constraint is passing and 0 indicates a failure as shown by t1 in FIG. 7. Additional input nodes are created for each change set element/feature where 1 indicates that the element/feature is present in the change set and 0 indicate that the change set element/feature is not present. For this example, the author and filenames available for the change set elements/features may be shown by a1, f1, and f2 representing an author and two files respectively. In other embodiments, the input set may include various types of change set elements/features, such as authors, file name, type of changes, location, time, date, code size, and the like. In machine learning and pattern recognition, a feature may be an individual measurable property of a phenomenon being observed. Various elements/features may be defined to measure or describe various properties and/or characteristics of change sets.

Change set elements/features related to the author element/feature may include the name of the author, job title, ID, age, coding experience level, years of experience, history of success/failure, technical expertise, programming language skills, organization department, location, relationship to other authors, and the like. Change set elements/features related to the change set may include the time and/or date the change set was composed, time and/or date the change set was submitted, the size of change set, difficulty level, type of changes, levels of changes made to the code base (e.g., global or local changes to the code base), and the like. As such, various change set elements/features may be used to characterize the change set and to predict the likelihood of success/failure of the change set based on historical data previously collected.

As shown in FIG. 7, the first hidden layer may be created with a number of nodes equivalent to the number of files multiplied by the number of quality constraints plus the number of authors. This number is to achieve an ideal learning rate for the targeted functionality of classifying the likelihood of the change set to contribute to the failure based upon the author's historical ability to produce quality work and the relationship between the files and the tests. The input nodes for quality constraints are then connected to all author nodes and the corresponding combination of file and quality constraint. The input nodes for each author is connected to the corresponding hidden node for the author and the input node for each file is connected to the corresponding hidden nodes representing the combination of quality constraints and files.

A second hidden layer is then created for each combination of author, file, and quality constraint. The nodes in the first hidden layer are connected to the nodes in this second hidden layer based upon the presence of the elements they are intended to represent. For example, the author nodes in the first hidden layer are connected to the corresponding combinations in the second hidden layer and similarly the file and quality constraint combinations in the first layer are connected to the corresponding nodes in the second hidden layer.

This second layer is then connected to the output layer which will give the classification or likelihood of the change to cause the failure. This can be taken as a raw value, or bucketed in high-level risk classification (e.g. high chance, medium chance, low chance) as shown by the risk node representing the output node in this case.

Once the change set(s) showing the greatest likelihood of causing the violation of the quality have been identified, the failing quality constraints may then be tested against these change sets in isolation. If the quality constraints are still violated on the high risk change set(s) in isolation, then the change sets are returned to the authors to be corrected. Otherwise, the ANN is not satisfactory and the process may revert to a defect search in an attempt to find the change set(s) causing the failure.

At step 306, the application server 170 may determine fail change sets in the queue by utilizing a defect search algorithm. For the defect search algorithm, the application server 170 may apply the algorithm with a recursive method or an iterative method. For example, a recursive method may accept a queue of failing change sets ($q_i$) and return two queues where one queue is the set of passing change sets ($q_p$) from the input queue $q_i$ and one queue is the set of defective change sets ($q_d$) from the inputs. Based on a first-in-first-out queue, the change set $q_i$ may be sorted by their respective timestamps indicating when the application server 170 first accepted the respective change sets into the system. The recursive method would then divide the change sets from the input queue $q_i$ into two or more groups and iterate over those groups where the initial group is $g_0$ and the current group in the iteration is $g_i$. The size of these groups can be varied to minimize computational resources by minimizing the number of times the recursive method is executed. For each iteration of $g_i$, $g_i$ is appended to $q_p$ and the quality constraints are executed against $q_p$. An action is taken based upon the results of the quality constraints and other conditions:

Case 1: If the quality constraints are satisfied, then process continues iterating on $g_i$.

Case 2: If one or more quality constraints fail and $g_i$ contains only a single change set, then remove $g_i$ from $q_p$ and add $g_i$ to $q_d$, then process continues iterating on $g_i$.

Case 3: If one or more quality constraints fail and $g_i$ contains more than one change set, then remove $g_i$ from $q_p$ and call the recursive method with $g_i$ as the input queue. Upon return of this recursive method, append the passing change sets to $q_p$ and append the defective change sets to $q_d$, then the process continues iterating on $g_i$.

Figure 8:
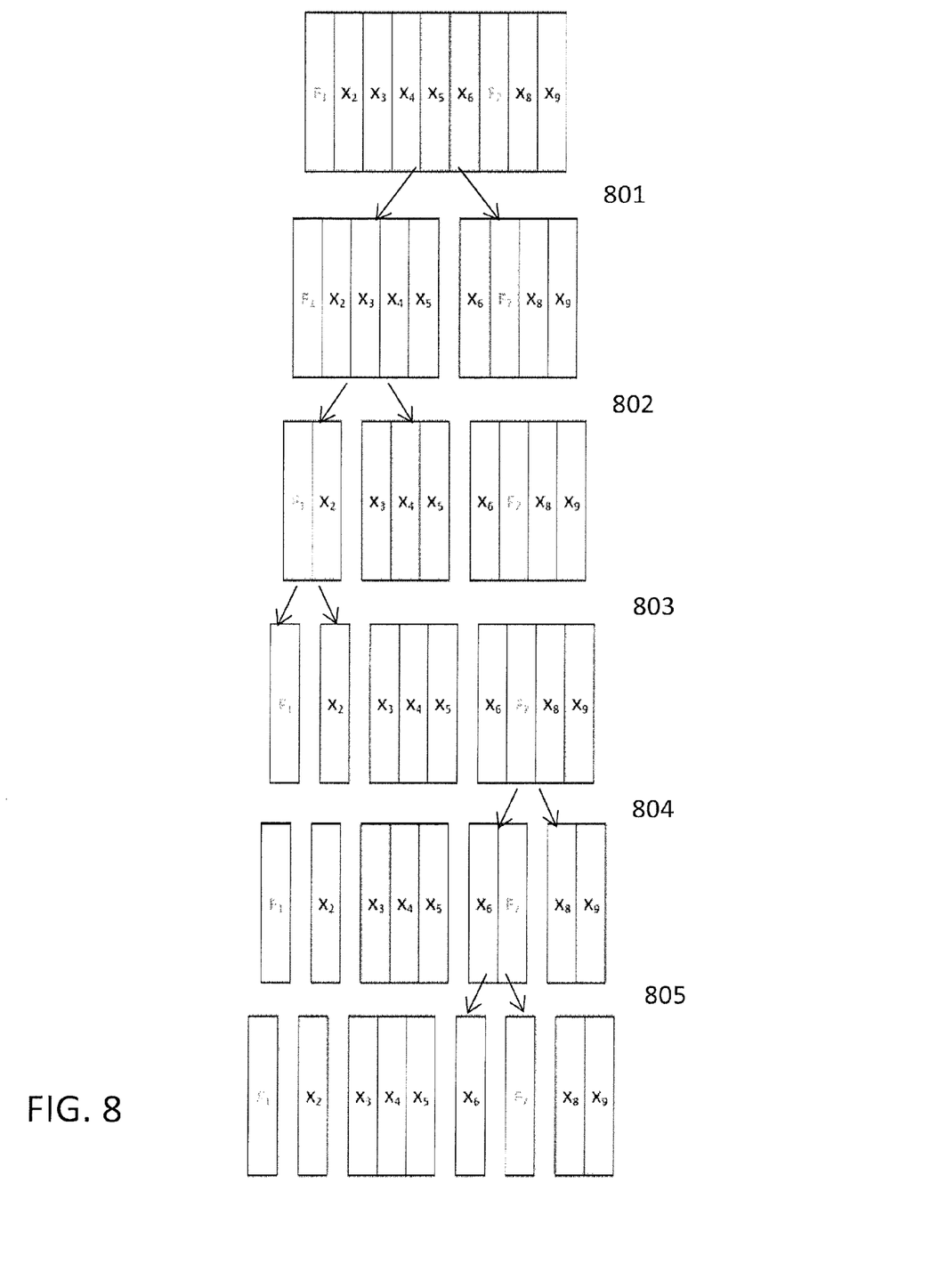
FIG. 8 is a diagram illustrating a defect search technique according to an embodiment.

An example of the recursive method is illustrated in FIG. 8. In this example, a queue with nine change sets, two of which are defective and denoted by $F_i$ and seven of which are defect free and denoted by $X_i$ is received by the application server 170. The application server 170 may apply the recursive method on the queue in the example. The recursive method may divide the queue into two groups of equivalent size, adjusting appropriately for odd numbers. Although this example divides the queue into two queues for demonstrative purposes, a different number of groups and sizes may achieve more optimal results (e.g., three groups of three change sets). For example, the queue in FIG. 8 is divided into two groups at stage 801 where one group has five change sets and the other four change sets. The recursive method may then execute quality constraints on the set of five change sets which fails due to the defective change set $F_1$. Due to the failing quality constraint, the recursion continues through stages 802 and 803, where upon completion of stage 803 the change set $F_1$ is isolated and identified as defective.

Since no passing change set has yet been identified, the group with change set $X_2$ is tested against quality constraints and passes, thereby adding the group to the queue of passing change sets and continuing on to the next group by first returning up the recursion stack at stage 803. The change sets $X_3$, $X_4$, and $X_5$ in the next group are then integrated with the passing change sets containing $X_2$ and satisfies quality constraints as well, thereby adding $X_3$, $X_4$, and $X_5$ to the queue of passing change sets and continuing on to the next group by first returning up the recursion stack at stage 802. The group with the change sets $X_6$, $F_7$, $X_8$, and $X_9$ would then be integrated with the passing change sets containing $X_2$, $X_3$, $X_4$, and $X_5$ and validated against quality constraints. In this case, the set fails on the quality constraints and the recursion continues through stages 804 and 805. After stage 805, the group with change set $X_6$ is integrated with the queue of passing change sets and still satisfies quality constraints, thereby adding $X_6$ to the queue of passing change set and continuing on to the next group. The next group contains $F_7$ which is now isolated and identified as defective and returns up the recursion stack at stages 805 and 804. The next group with change sets $X_8$ and $X_9$ are then integrated with the queue of passing change sets and validated against quality constraints, which passes and $X_8$ and $X_9$ are added to the queue of passing change sets. At this point, there are not remaining change sets to process and the recursion returns up the recursion stack, returning seven passing change sets containing $X_2$, $X_3$, $X_4$, $X_5$, $X_6$, $X_8$, and $X_9$ and two defective change sets containing $F_1$ and $F_7$.

Please note, in the case where the defect $F_7$ is an integration defect (e.g. the change set is defect when applied in conjunction with $X_6$), the conventional approach of identifying the root cause of the failure by validating quality constraints against each individual change set would fail to identify the integration defect introduced by $F_7$. At step 308, after this process has been completed, the application server 170 may remove the change sets failing on quality constraints from the queue in the continuous integration system and the authors may be notified at step 310. The authors/users may be notified of the failed change sets via various electronic means, such as emails, text messages, online postings, online user interface (web pages), and the like. The application server 170 may pass the remaining change sets that have passed quality constraints on to the next level in the continuous integration certification process.

Accordingly, the automated failure analysis may reduce the need for manual investigation to determine the change sets that caused the failure. Additionally, the algorithms minimize the number of builds and tests of quality constraints required to identify the failing change sets thereby improving the function/efficiency of the application server 170 and reducing the hardware resources required to support such an automated system.

Figure 4:
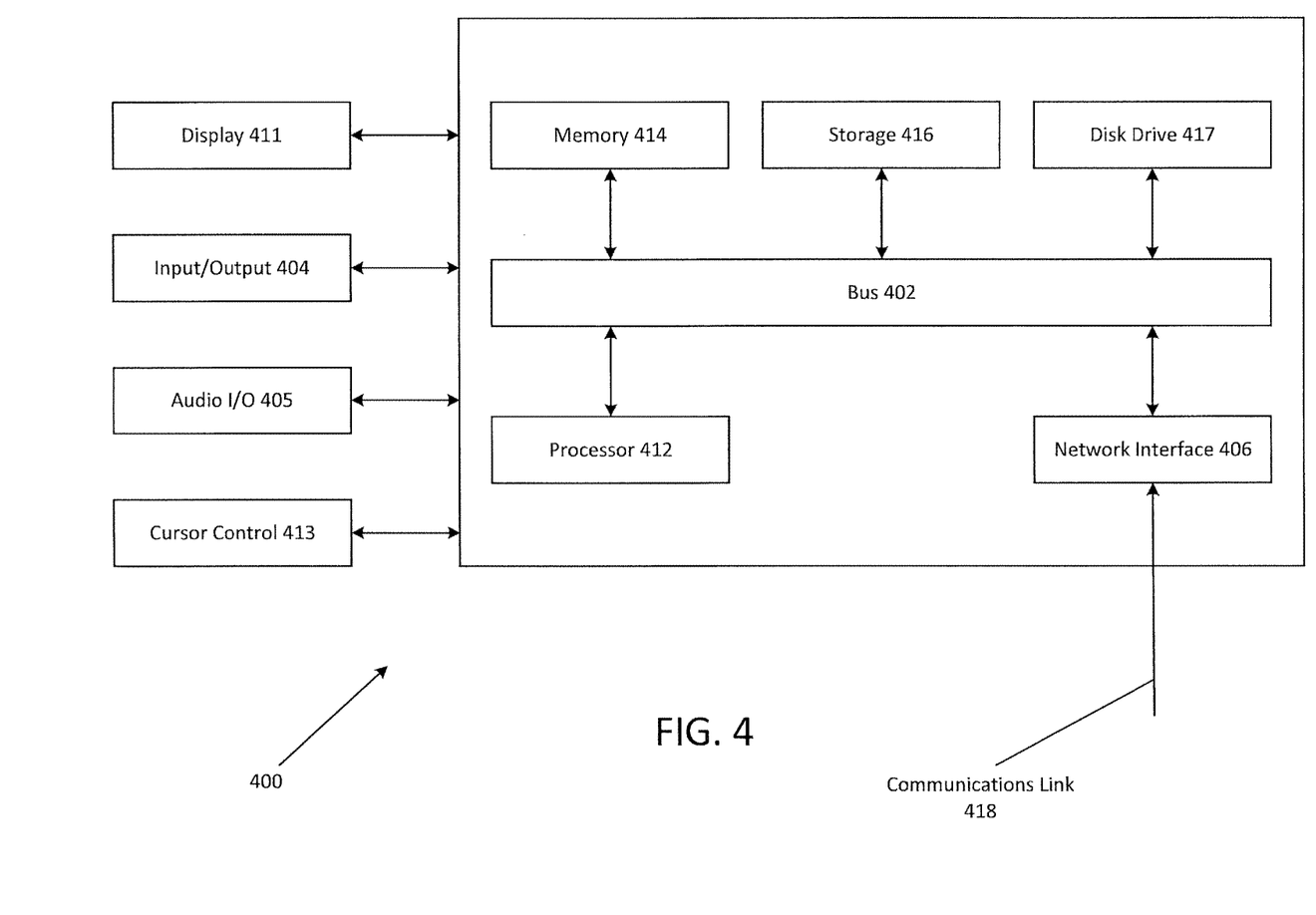
FIG. 4 is a block diagram of a computer system suitable for implementing one or more components in FIG. 1 according to an embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, wearable device, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 360. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:
1. A system comprising:
a non-transitory memory; and
one or more hardware processors coupled to the non-transitory memory and configured to read instructions from the non-transitory memory to cause the system to perform operations comprising:
  receiving a plurality of change sets submitted by one or more users to update or modify a code base;
  arranging the plurality of change sets in a queue;
  determining an average rate of delivery over time for the queue, an average pipeline latency for the queue, and an average defect introduction rate for the queue;
  computing, for the queue, a queue quality value based on the determined average rate of delivery over time for the queue, the determined average pipeline latency for the queue, and the determined average defect introduction rate for the queue;
  determining whether the queue quality value of the queue exceeds a threshold;
  dividing the plurality of change sets in the queue into sub-queues when it is determined that the queue quality value of the queue exceeds the threshold;
  processing the sub-queues to remove one or more defective change sets in the sub-queues;
  recombining the sub-queues back to the queue; and
  integrating the plurality of change sets in the queue into the code base.

2. The system of claim 1, wherein the queue quality value of the queue comprises a product of the average rate of delivery over time for the queue, the average pipeline latency for the queue, and the average defect introduction rate for the queue.

3. The system of claim 1, wherein processing the sub-queues to remove the one or more defective change sets in the sub-queues comprises analyzing the sub-queues separately to identity the one or more defective change sets in the sub-queues.

4. The system of claim 1, wherein the operations further comprise performing the computing, the determining, and the dividing on the sub-queues recursively until reaching sub-queues with a queue quality value that does not exceed the threshold.

5. The system of claim 4, wherein the operations further comprise:
   identifying the one or more defective change sets from the sub-queues;
   removing the one or more defective change sets from the sub-queues; and
   recursively recombining the sub-queues back to the queue.

6. The system of claim 5, wherein identifying the one or more defective change sets from the sub-queues comprises using first quality constraints to identify a first defective change set in a first sub-queue based on a first recursive depth level of the first sub-queue and using second quality constraints to identify a second defective change set in a second sub-queue based on a second recursive depth level of the second sub-queue.

7. The system of claim 6, wherein the first quality constraints are less than the second quality constraints when the first recursive depth level is lower than the second recursive depth level.

8. The system of claim 4, wherein the operations further comprise changing the threshold for determining whether to further divide a sub-queue based on a recursive depth level of the sub-queue.

9. The system of claim 1, wherein integrating the plurality of change sets in the queue into the code base comprises integrating the recombined sub-queues in the queue into the code base.

10. A method comprising:
    receiving, by one or more hardware processors, a plurality of change sets submitted by one or more users to update or modify a code base;
    arranging, by the one or more hardware processors, the plurality of change sets in a queue;
    determining, by the one or more hardware processors, an average rate of delivery over time for the queue, an average pipeline latency for the queue, and an average defect introduction rate for the queue;
    computing, by the one or more hardware processors for the queue, a queue quality value based on the determined average rate of delivery over time for the queue, the determined average pipeline latency for the queue, and the determined average defect introduction rate for the queue;
    determining, by the one or more hardware processors, whether the queue quality value of the queue exceeds a threshold;
    dividing, by the one or more hardware processors, the plurality of change sets in the queue into sub-queues when it is determined that the queue quality value exceeds the threshold;
    processing, by the one or more hardware processors, the sub-queues to remove one or more defective change sets in the sub-queues;
    recombining, by the one or more hardware processors, the sub-queues back to the queue; and
    integrating, by the one or more hardware processors, the plurality of change sets in the queue into the code base.

11. The method of claim 10, wherein the queue quality value of the queue comprises a product of the average rate of delivery over time for the queue, the average pipeline latency for the queue, and the average defect introduction rate for the queue.

12. The method of claim 11, wherein processing the sub-queues to remove the one or more defective change sets in the sub-queues comprises analyzing the sub-queues separately to identity the one or more defective change sets in the sub-queues.

13. The method of claim 10, further comprising performing the computing, the determining, and the dividing on the sub-queues recursively until reaching sub-queues with a queue quality value that does not exceed the threshold.

14. The method of claim 13, further comprising:
    identifying the one or more defective change sets from the sub-queues;
    removing the one or more defective change sets from the sub-queues; and
    recursively recombining the sub-queues back to the queue.

15. The method of claim 14, wherein identifying the one or more defective change sets from the sub-queues comprises using first quality constraints to identify a first defective change set in a first sub-queue based on a first recursive depth level of the first sub-queue and using second quality constraints to identify a second defective change set in a second sub-queue based on a second recursive depth level of the second sub-queue.

16. The method of claim 13, further comprising changing the threshold for determining whether to further divide a sub-queue based on a recursive depth level of the sub-queue.

17. The method of claim 10, wherein integrating the plurality of change sets in the queue into the code base comprises integrating the recombined sub-queues in the queue into the code base.

18. A non-transitory machine-readable medium having stored thereon machine-readable instructions executable to cause a machine to perform operations comprising:
    receiving a plurality of change sets submitted by one or more users to update or modify a code base;
    arranging the plurality of change sets in a queue;
    determining an average rate of delivery over time for the queue, an average pipeline latency for the queue, and an average defect introduction rate for the queue;
    computing, for the queue, a queue quality value based on the determined average rate of delivery over time for the queue, the determined average pipeline latency for the queue, and the determined average defect introduction rate for the queue;
    determining whether the queue quality value of the queue exceeds a threshold;
    dividing the plurality of change sets in the queue into sub-queues when it is determined that the queue quality value of the queue exceeds the threshold;
    processing the sub-queues to remove one or more defective change sets in the sub-queues;
    recombining the sub-queues back to the queue; and
    integrating the plurality of change sets in the queue into the code base.

19. The non-transitory machine-readable medium of claim 18, wherein the queue quality value of the queue comprises a product of the average rate of delivery over time for the queue, the average pipeline latency for the queue, and the average defect introduction rate for the queue.

20. The non-transitory machine-readable medium of claim 18, wherein the operations further comprise:
- identifying the one or more defective change sets from the sub-queues;
- removing the one or more defective change sets from the sub-queues;
- recursively recombining the sub-queues back to the queue; and
- integrating the recombined sub-queues in the queue into the code base.

* * * * *

UNITED STATES PATENT AND TRADEMARK OFFICE
CERTIFICATE OF CORRECTION

PATENT NO. : 10,025,692 B2
APPLICATION NO. : 15/199837
DATED : July 17, 2018
INVENTOR(S) : Zachary Paul Wood and Justin Vincent Montoya It is certified that error appears in the above-identified patent and that said Letters Patent is hereby corrected as shown below:

In the Specification

In the Detailed Description:

In Column 8, Line 1, change "$^s\text{target}^1$" to --$s^1_{\text{target}}$--.

In the Claims

In Claim 3, Column 15, Line 9, change "identity" to --identify--.

In Claim 12, Column 16, Line 16, change "identity" to --identify--.

Signed and Sealed this
Second Day of October, 2018

Andrei Iancu
*Director of the United States Patent and Trademark Office*